(12) United States Patent
Smith et al.

(10) Patent No.: US 10,243,237 B2
(45) Date of Patent: **\*Mar. 26, 2019**

(54) BATTERY BASED ON ORGANOSULFUR SPECIES

(71) Applicant: Arkema Inc., King of Prussia, PA (US)

(72) Inventors: Gary S. Smith, Collegeville, PA (US);
Lijuan Wang, Collegeville, PA (US);
George C. Fortman, Conshohocken, PA (US)

(73) Assignee: Arkema Inc., King of Prussia, PA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 15/367,379

(22) Filed: Dec. 2, 2016

(65) Prior Publication Data

US 2017/0084953 A1    Mar. 23, 2017

Related U.S. Application Data

(63) Continuation-in-part of application No. 14/391,026, filed as application No. PCT/US2013/035716 on Apr. 9, 2013, now Pat. No. 10,079,405.
(Continued)

(51) Int. Cl.
*H01M 10/0567* (2010.01)
*H01M 4/40* (2006.01)
(Continued)

(52) U.S. Cl.
CPC ..... *H01M 10/0567* (2013.01); *H01M 2/1653* (2013.01); *H01M 4/38* (2013.01); *H01M 4/381* (2013.01); *H01M 4/382* (2013.01); *H01M 4/405* (2013.01); *H01M 4/62* (2013.01); *H01M 4/622* (2013.01); *H01M 10/052* (2013.01); *H01M 10/054* (2013.01); *H01M 10/0565* (2013.01);
(Continued)

(58) Field of Classification Search
None
See application file for complete search history.

(56) References Cited

U.S. PATENT DOCUMENTS 4,833,048 A  5/1989  Dejonghe et al.
4,917,974 A  4/1990  De Jonghe et al.
(Continued)

FOREIGN PATENT DOCUMENTS

EP    1162677 A2 \* 12/2001  ............ H01M 4/136
GB    2 420 907 A    7/2006
(Continued)

OTHER PUBLICATIONS

Journal of Power Sources 2011, 196—V. S. Kolosnitsyn et al; "A Study of the Electrochemical Processes in Lithium-Sulpher Cells by Impedance Spectroscopy" pp. 1478-1482.
(Continued)

*Primary Examiner* — Katie L. Hammer
(74) *Attorney, Agent, or Firm* — Steven D. Boyd

(57) ABSTRACT

Metal-sulfur batteries, such as lithium-sulfur batteries, are prepared using one or more organosulfur species such as organic polysulfides and organic polythiolates as part of the liquid or gel electrolyte solution, as part of the cathode, as part of the anode (or used to treat the anode), and/or as part of a functionalized porous polymer providing an intermediate separator element.

10 Claims, 2 Drawing Sheets

Related U.S. Application Data

(60) Provisional application No. 61/623,723, filed on Apr. 13, 2012.

(51) Int. Cl.
*H01M 4/62* (2006.01)
*H01M 10/0565* (2010.01)
*H01M 2/16* (2006.01)
*H01M 4/38* (2006.01)
*H01M 10/052* (2010.01)
*H01M 10/054* (2010.01)
*H01M 10/0569* (2010.01)
*H01M 10/0568* (2010.01)

(52) U.S. Cl.
CPC ........ *H01M 10/0569* (2013.01); *H01M 4/625* (2013.01); *H01M 10/0568* (2013.01); *H01M 2220/10* (2013.01); *H01M 2220/20* (2013.01); *H01M 2300/0025* (2013.01); *H01M 2300/0085* (2013.01); *Y02E 60/122* (2013.01)

(56) References Cited

U.S. PATENT DOCUMENTS

| | | |
|---|---|---|
| 6,436,583 B1 | 8/2002 | Mikhaylik |
| 6,569,573 B1 | 5/2003 | Mikhaylik et al. |
| 6,919,143 B2 | 7/2005 | Hwang et al. |
| 7,217,480 B2 | 5/2007 | Han et al. |
| 7,279,249 B2 | 10/2007 | Kim et al. |
| 7,517,612 B2 | 4/2009 | Ryu et al. |
| 7,977,491 B2 | 7/2011 | Nakamura |
| 2001/0033971 A1* | 10/2001 | Zhao ..................... C08F 8/00 429/231.8 |
| 2004/0157132 A1 | 8/2004 | Kim et al. |
| 2008/0100264 A1 | 5/2008 | Kolosnitsvn et al. |
| 2009/0325065 A1 | 12/2009 | Fujii et al. |
| 2010/0129724 A1 | 5/2010 | Kolosnitsyn |
| 2011/0165462 A1 | 7/2011 | Zhamu et al. |
| 2013/0065127 A1 | 3/2013 | Nazar et al. |

FOREIGN PATENT DOCUMENTS

| | | |
|---|---|---|
| JP | 2005108724 A | 4/2005 |
| JP | 2009026675 A | 2/2009 |

OTHER PUBLICATIONS

Handbook of Battery Materials ; Zengcai Liu et al; "Lithium-Sulfur Batteries" 2nd Edition, Chapter 14—2011 pp. 811-840.
Boris A. Trofimov, et al.; "Protected bis(hydroxyorganyl) polysulfides as modifiers of LI/S battery electrolyte"; Electrochimica Acta 56 (2011) pp. 2458-2463.

\* cited by examiner

BATTERY BASED ON ORGANOSULFUR SPECIES

CROSS-REFERENCE TO RELATED APPLICATIONS

This is a Continuation-In-Part of U.S. application Ser. No. 14/391,026, filed 7 Oct. 2014, which is the national phase of International Application No. PCT/US2013/35716, filed 9 Apr. 2013, which claims priority to U.S. Provisional Application No. 61/623,723, filed 13 Apr. 2012. The disclosure of each of these applications is incorporated herein by reference in its entirety for all purposes.

FIELD OF THE INVENTION

The invention relates to batteries having an anode based on sodium, lithium, potassium, magnesium or a mixture thereof or alloy or composite of sodium, lithium, potassium and/or magnesium with one or more other metals and a cathode based on elemental sulfur, selenium, or mixture of elemental chalcogens, the anode and cathode being separated by a separator element with a liquid or gel electrolyte solution of a conductive salt in a nonaqueous polar aprotic solvent or polymer in contact with the electrodes.

BACKGROUND OF THE INVENTION

Electrochemical batteries are a principal means for storing and delivering electrical energy. Due to increasing demands for energy for electronic, transportation and grid-storage applications, the need for batteries with ever more power storage and delivery capability will continue long into the future.

Because of their light weight and high energy storage capacity as compared to other types of batteries, lithium ion batteries have been widely used since the early 1990's for portable electronic applications. However, current Li-ion battery technology does not meet the high power and energy needs for large applications such as grid storage or electric vehicles with driving ranges that are competitive with vehicles powered by internal combustion engines. Thus, extensive efforts in the scientific and technical communities continue to identify batteries with higher energy density and capacity.

Sodium-sulfur and lithium-sulfur electrochemical cells offer even higher theoretical energy capacity than Li-ion cells and thus have continued to elicit interest as "next-generation" battery systems. Electrochemical conversion of elemental sulfur to the monomeric sulfide ($S^{2-}$) offers a theoretical capacity of 1675 mAh/g as compared to less than 300 mAh/g for Li-ion cells.

Sodium-sulfur batteries have been developed and launched as commercial systems. Unfortunately, the sodium-sulfur cell typically requires high temperatures (above 300° C.) to be functional, and thus is only suitable for large stationary applications.

Lithium-sulfur electrochemical cells, initially proposed in the late 1950's and 1960's, are only now being developed as commercial battery systems. These cells offer theoretical specific energy densities above 2500 Wh/kg (2800 Wh/L) vs. 624 Wh/g for lithium ion. The demonstrated specific energy densities for Li—S cells are in the range of 250-350 Wh/kg, as compared to 100 Wh/g for Li-ion cells, the lower values being the result of specific features of the electrochemical processes for these systems during charge and discharge. Given that the practical specific energies of lithium batteries are typically 25-35% of the theoretical value, the optimum practical specific energy for a Li—S system would be around 780 Wh/g (30% theoretical). [V.S. Kolosnitsyn, E. Karaseva, U.S. Patent Application 2008/0100624 A1]

The lithium-sulfur chemistry offers a number of technical challenges that have hindered the development of these electrochemical cells, particularly poor discharge-charge cyclability. Nonetheless, because of the inherent low weight, low cost, high power capacity of the lithium-sulfur cell, great interest exists in improving the performance of the lithium-sulfur system and extensive work has been performed in the last 20 years by many researchers all over the world to address these issues. [C. Liang, et al. in *Handbook of Battery Materials* $2^{nd}$ Ed., Chapter 14, pp. 811-840 (2011); V. S. Kolosnitsyn, et al., *J. Power Sources* 2011, 196, 1478-82; and references therein.]

A cell design for a lithium-sulfur system typically includes:

An anode consisting of lithium metal, lithium-alloy or lithium-containing composite materials.

A non-reactive but porous separator between the anode and cathode (often polypropylene or α-alumina). The presence of this separator results in separate anolyte and catholyte compartments.

A porous sulfur-bearing cathode that incorporates a binder (often polyvinylidene difluoride) and a conductivity-enhancing material (often graphite, mesoporous graphite, multiwall carbon nanotubes, graphene), An electrolyte consisting of a polar aprotic solvent and one or more conductive Li salts [$(CF_3SO_2)_2N^-$, $CF_3SO_3^-$, $CH_3SO_3^-$, $ClO_4^-$, $PF_6^-$, $AsF_6^-$, halogens, etc.]. The solvents used in these cells have included basic (cation-complexing) aprotic polar solvents such as sulfolane, dimethyl sulfoxide, dimethylacetamide, tetramethyl urea, N-methyl pyrrolidinone, tetraethyl sulfamide, tetrahydrofuran, methyl-THF, 1,3-dioxolane, diglyme, and tetraglyme. Lower polarity solvents are not suitable due to poor conductivity and poor ability to solvate $Li^+$ species, and protic solvents can react with Li metal. In solid-state versions of the lithium-sulfur cell, the liquid solvents are replaced with a polymeric material such as polyethylene oxide.

Current collectors and appropriate casing materials.

SUMMARY OF THE INVENTION

Compositions and applications of organic polysuifides, organic thiolates and organic polythiolates for use in metal-sulfur batteries, particularly lithium-sulfur batteries, are provided by the present invention. The organic polysullide, organic thiolate and organopolythiolate species (hereinafter sometimes referred to as "organosulftir species") act to improve the performance of such electrochemical cells during repeated discharge and charge cycles.

The present invention thus relates to chemical sources of energy comprising a cell or battery with one or more positive electrodes (cathodes), one or more negative electrodes anodes) and an electrolyte media, wherein the operative chemistry involves reduction of sulfur or polysulfide species and oxidation of the reactive metal species. The negative electrode comprises a reactive metal such as lithium, sodium, potassium, magnesium or alloys/composites of those metals with other materials; in certain embodiments the negative electrode additionally comprises at least one organosulfur species and/or has been treated with at least one organosulfur species. The positive electrode comprises elemental sulfur and/or selenium and, in certain embodiments of the invention, organosulfur species such as organic polysulfide species and/or metal organic polysulfide salts, and matrices containing these species. The electrolyte matrices, in certain embodiments, comprise mixtures of organic solvent or polymers, inorganic or organic polysulfide species, carriers for the ionic form of the active metal, and other components intended to optimize electrochemical performance.

Specifically, this invention relates to the use of organic sulfides and polysulfides, and their lithium (or sodium, potassium, magnesium, quaternary ammonium or quaternary phosphonium) organothiolate or organopolythiolate analogs, as components in the cathode and electrolyte matrices. Said organosulfur species chemically combine with sulfur and anionic mono- or polysulfide species to form organopolythiolate species which have increased affinity for the nonpolar sulfur components of the positive cathode and catholyte phase. The organosulfur species is also capable of reacting with the reactive metal or metals present in the negative electrode, to form metal salts of the organosulfur species on the surface of the negative electrode which help to enhance the performance of an electrochemical cell containing such organosulfur species-treated negative electrodes. Without wishing to be bound by theory, it is believed that the organosulfur species chemically combine with the reactive metal(s) of the anode and prevent the buildup of $LiS_2$ on the anode as a result of a reaction between dissolved $Li_2S_n$ ($n\geq 1$) species often present in the electrolyte solutions used in metal sulfur batteries. Accordingly, the presence of organosulfur species or the treatment of an anode with organosulfur species may help to prevent the translational flow of sulfur atoms or anions from the cathode to the anode by forming a protective layer on the anode surface which is capable of conducting metal cations. The electrolyte becomes saturated in metal polysulfide species, resulting in less sulfur loss from the cathode, higher battery capacities, and increased total cycling life for the battery.

One aspect of the invention provides a battery, the battery comprising:
a) an anode comprising an anode active material comprising sodium, lithium, potassium, magnesium or an alloy or composite of at least one of sodium, lithium, potassium or magnesium with at least one other metal for providing ions;
b) a cathode comprising a cathode active material comprising elemental sulfur, elemental selenium or a mixture of elemental chalcogens; and
c) an intermediate separator element positioned between the anode and cathode acting to separate liquid or gel electrolyte solutions in contact with the anode and cathode, through which metal ions and their counterions move between the anode and cathode during charge and discharge cycles of the battery;
wherein the liquid or gel electrolyte solutions comprise a nonaqueous polar aprotic solvent or polymer and a conductive salt and at least one of conditions (i), (ii), (iii) or (iv) is met:
(i) at least one of the liquid or gel electrolyte solutions additionally comprise at least one organosulfur species;
(ii) the cathode is additionally comprised of at least one organosulfur species;
(iii) the intermediate separator element comprises a functionalized porous polymer containing at least one organosulfur species;
(iv) the anode is additionally comprised of or has been treated with at least one organosulfur species;
wherein the organosulfur species comprises at least one organic moiety and at least one —S—$S_n$-linkage, with n being 0 or an integer of 1 or more.

In one embodiment, just one of conditions (i), (ii), (iii) or (iv) is met. In another embodiment, all four conditions are met. In still another embodiment, only two or three of the conditions are met, e.g., (i) and (ii), (i) and (iii), (ii) and (iii), (i), (ii) and (iii), (ii), (iii) and (iv), (i), (iii) and (iv), or (i), (ii) and (iv).

In another aspect, the invention provides an electrolyte comprising at least one nonaqueous polar aprotic solvent or polymer, at least one conductive salt, and at least one organosulfur species comprised of at least one organic moiety and at least one —S—$S_n$-linkage wherein n is an integer of 1 or more.

Another aspect of the invention provides a cathode comprising a) elemental sulfur, elemental selenium or a mixture of elemental chalcogens, b) at least one electrically conductive additive, c) and at least one organosulfur species comprising at least one organic moiety and at least one —S—$S_n$-linkage, n being 0 or an integer of 1 or more.

A further aspect of the invention provides an anode comprising an anode active material comprising sodium, lithium, potassium, magnesium or an alloy or composite of at least one of sodium, lithium, potassium or magnesium with at least one other metal for providing ions, wherein the anode additionally comprises or has been treated with at least one organosulfur species comprising at least one organic moiety and at least one —S—$S_n$-linkage, n being 0 or an integer of 1 or more. Such treatment results in increased battery life and reduced capacity fade on subsequent cycles.

The organosulfur species, for example, may be selected from the group consisting of organic polysulfides, organic thiolates (where n=0, corresponding for example to the general formula R—S-M, where R is an organic moiety and M is a cation such as Li, Na, K, Mg, quaternary ammonium, or quaternary phosphonium) and/or metal organic polythiolates. In certain embodiments of the invention, the organosulfur species contains one or more sulfur-containing functional groups selected from the group consisting of dithioacetal, dithioketal, trithio-orthocarbonate, thiosulfonate [—S(O)$_2$—S—], thiosulfinate [—S(O)—S—], thiocarboxylate [—C(O)—S—], dithiocarboxylate [—C(S)—S—], thiophosphate, thiophosphonate, monothiocarbonate, dithiocarbonate, and trithiocarbonate. In other embodiments, the organosulfur species may be selected from the group consisting of aromatic polysulfides, polyether-polysulfides, polysulfide-acid salts and mixtures thereof.

DETAILED DESCRIPTION OF THE INVENTION

Figure 1:
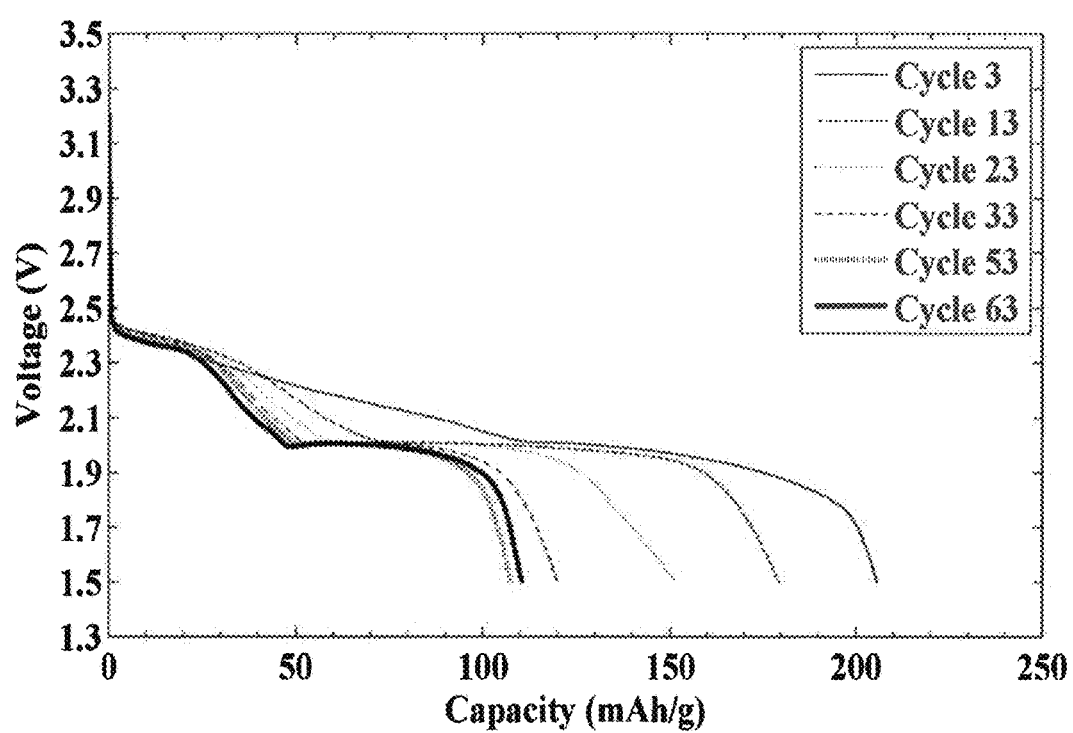
FIG. 1 shows discharge profiles of lithium-sulfur battery with n-$C_{12}H_{25}$SLi added to the cathode for repeated charge/discharge cycles 3 to 63.

An electmactive material that has been fabricated into a structure for use in a battery is referred to as an electrode. Of a pair of electrodes used in a battery, which serves as a chemical source of electrical energy, the electrode on the side having a higher electrochemical potential is referred to as the positive electrode, or the cathode, while the electrode on the side having a lower electrochemical potential is referred to as the negative electrode, or the anode. As used herein, the conventional nomenclature for batteries is employed wherein the terms "cathode" or "positive electrode" and "anode" or "negative electrode" refer to the electrochemical functions of the electrodes during discharge of the cell to provide electrical energy. During the charging portion of the cycle, the actual electrochemical functions of an electrode are reversed versus that which occurs during discharge, but the designation of the respective electrodes remains the same as for discharge.

Electrochemical cells are commonly combined in series, the aggregate of such cells being referred to as a battery. Based on the operative chemistry of the cells, primary batteries are designed for a single discharge to provide power for an external device. Secondary batteries are rechargeable, using electrical energy from an external source, and thus offer extended use over multiple discharge and charge cycles.

An electrochemically active material used in the cathode or positive electrode is referred to hereinafter as a cathode active material. An electrochemically active material used in the anode or negative electrode is hereinafter referred to as an anode active material. Multi-component compositions possessing electrochemical activity and comprising an electrochemically active material and optional electrically conductive additive and binder, as well as other optional additives, are referred to hereinafter as electrode compositions. A battery comprising a cathode with the cathode active material in an oxidized state and an anode with the anode active material in a reduced state is referred to as being in a charged state. Accordingly, battery comprising a cathode with the cathode active material in a reduced state, and an anode with the anode active material in an oxidized state, is referred to as being in a discharged state.

Without wishing to be bound by theory, the following are certain possible advantages or features of the present invention. The organosulfur species may partition to the sulfur-rich catholyte phase. The chemical exchange reactions between dianionic sulfides or polysulfides (e.g., $Li_2S_x$, x=1, 2, 3 . . . ) and the organopolysulfides, organothiolates or organopolythiolates (e.g., R—$S_x$—R' or R—$S_x$—Li, R and R'=organic moieties, x=0 or an integer of 1 or more), along with sulfur extrusion/reinsertion chemistries common to polysulfides and polythiolates, favor minimizing the amount of the dianionic polysulfides in the catholyte and favor redeposition of sulfur and sulfur-containing species at the cathode. The net removal of the dianionic polysulfides would reduce the electrolyte viscosity and thus minimize the deleterious effects of high viscosity on electrolyte conductivity. The organosulfur species may also increase the dissolution, and thus scavenging, of insoluble low-rank lithium sulfide species (particularly $Li_2S$ and $Li_2S_2$) in both the catholyte and anolyte phases, thus minimizing loss of reactive lithium species upon repeated charge/discharge cycles. The performance of the organosulfur species can be "tuned" by selection of the organic functionality. For example, short chain alkyl or alkyl groups with more polar functionality, would partition more to the anolyte phase, while the longer-chain or less-polar analogs would partition more to the catholyte phase. Adjusting the relative ratios of the long/nonpolar and short/polar chain organic species would provide a means of controlling the partition of sulfur-containing species to the cathode/catholyte. Moreover, since the presence of some amount of polysulfide or polythiolate in the anolyte is advantageous as a means of controlling lithium dendrite growth on the anode during charging, selection of appropriate organic moieties and their relative ratios would provide greater control of dendrite growth.

Organosulfur species useful in the present invention comprise at least one organic moiety and at least one —S—$S_n$— linkage, wherein n is 0 or an integer of at least 1. In one embodiment, the organosulfur species comprises two organic moieties per molecule (which may be the same as or different from each other) which are linked by a —S—$S_n$- (polysulfide) linkage (wherein n is an integer of 1 or more). The —S—$S_n$-linkage may form part of a larger linking group such as a —$Y^1$—C($Y^2Y^3$)—S—$S_n$-linkage or a —$Y^1$—C(=$Y^4$)—S—$S_n$-linkage, wherein $Y^1$ is 0 or S, $Y^2$ and $Y^3$ are independently an organic moiety or —S—$S_o$—Z, where o is 1 or more and Z is an organic moiety or a species selected from Li, Na, K, Mg, quaternary ammonium, or quaternary phosphonium, and $Y^4$ is O or S. In another embodiment, the organosulfur species contains a monovalent organic moiety and a species selected from Na, Li, K, Mg, quaternary ammonium and quaternary phosphonium which are linked by a —S—$S_n$-linkage (including, for example, a $Y^1$—C($Y^2Y^3$)—S—$S_n$-linkage or $Y^1$—C (=$Y^4$)—S—$S_n$-linkage, where n=0 or an integer of 1 or more). In still another embodiment, a —S—$S_n$-linkage may appear on either side of an organic moiety. For example, the organic moiety can be a divalent, optionally substituted aromatic moiety, C($R^3$)$_2$ (with each $R^3$ being independently H or an organic moiety such as a $C_1$-$C_{20}$ organic moiety), carbonyl (C=O) or thiocarbonyl (C=S).

The organosulfur species may, for example, be selected from the group consisting of organic polysulfides, organic thiolates, organic polythiolates, including those with sulfur-containing functional groups such as dithioacetal, dithioketal, trithio-orthocarbonate, aromatic polysulfide, polyether-polysulfide, polysulfide-acid salt, thiosulfonate [—S(O)$_2$—S—], thiosulfinate [—S(O)—S—], thiocarboxylate [—C(O)—S—], dithiocarboxylate [—RC(S)—S—], thiophosphate or thiophosphonate functionality, or mono-, di- or trithiocarbonate functionality; organo-metal polysulfides containing these or similar functionalities; and mixtures thereof.

Suitable organic moieties include, for example, mono-, di- and polyvalent organic moieties which may comprise branched, linear and/or cyclic hydrocarbyl groups. As used herein, the term "organic moiety" includes a moiety which may, in addition to carbon and hydrogen, comprise one or more heteroatoms such as oxygen, nitrogen, sulfur, halogen, phosphorus, selenium, silicon, a metal such as tin and the like. The heteroatom(s) may be present in the organic moiety in the form of a functional group. Thus, hydrocarbyl as well as functionalized hydrocarbyl groups are considered within the context of the present invention to be organic moieties. In one embodiment, the organic moiety is a $C_1$-$C_{20}$ organic moiety. In another embodiment, the organic moiety contains two or more carbon atoms. The organic moiety thus may be a $C_2$-$C_{20}$ organic moiety.

The organosulfur species may be monomeric, oligomeric or polymeric in character. For example, the —S—$S_n$-functionality may be pendant to the backbone of an oligomeric or polymeric species containing two or more repeating units of monomer in its backbone. The —S—$S_n$-functionality may be incorporated into the backbone of such an oligomer or polymer, such that the oligomer or polymer backbone contains a plurality of —S—$S_n$-linkages.

The organosulfur species may, for instance, be an organic polysulfide or mixture of organic polysulfides of formula $R^1$—S—$S_n$—$R^2$, wherein $R^1$ and $R^2$ independently represent a $C_1$-$C_{20}$ organic moiety and n is an integer of 1 or more. The $C_1$-$C_{20}$ organic moiety may be a monovalent branched, linear or cyclic hydrocarbyl group. $R^1$ and $R^2$ may each independently be a $C_9$-$C_{14}$ hydrocarbyl group, with n=1 (providing a disulfide, such as tertiary-dodecyl disulfide). In another embodiment, $R^1$ and $R^2$ are each independently a $C_9$-$C_{14}$ hydrocarbyl group, with n=2-5 (providing a polysulfide). Examples of such compounds include TPS-32 and TPS-20, sold by Arkema. In another embodiment, $R^1$ and $R^2$ are independently $C_7$-$C_{11}$ hydrocarbyl groups, with n=2-5. TPS-37LS, sold by Arkema, is an example of a suitable polysulfide of this type. Another type of suitable polysulfide would be a polysulfide or mixture of polysuifides wherein $R^1$ and $R^2$ are both tert-butyl and n=2-5. Examples of such organosulfur compounds include TPS-44 and TPS-54, sold by Arkema.

The organosulfur species could also be an organic polythiolate of formula $R^1$—S—$S_n$-M, wherein $R^1$ is a $C_1$-$C_{20}$ organic moiety, M is lithium, sodium, potassium, magnesium, quaternary ammonium, or quaternary phosphonium and n is an integer of 1 or more or an organic thiolate of formula $R^2$—S-M, wherein $R^2$ is a $C_1$-$C_{20}$ organic moiety, M is lithium, sodium, potassium, magnesium, quaternary ammonium, or quaternary phosphonium.

In another embodiment, the organosulfur species may be a dithioacetal or dithioketal such as those corresponding to formulas (I) and (II), or a trithio-orthocarboxylate of formula (III):

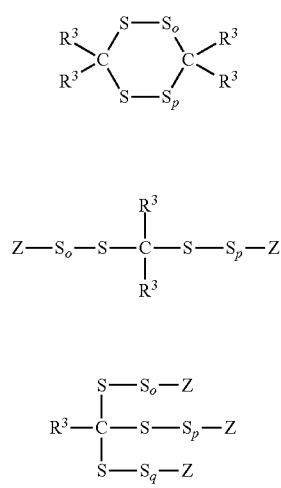

wherein each $R^3$ is independently H or a $C_1$-$C_{20}$ organic moiety, o, p and q are each independently an integer of 1 or more, and each Z is independently a $C_1$-$C_{20}$ organic moiety, Li, Na, K, Mg, quaternary ammonium, or quaternary phosphonium. Examples of such organosulfur species include 1,2,4,5-tetrathiane (formula I, $R^3$=H, o=p=1), tetramethyl-1,2,4,5-tetrathiane (formula I, $R^3$=$CH_3$, o=p=1), and oligo or polymeric species thereof.

Another embodiment of the invention utilizes an organosulfur species which is an aromatic polysulfide of formula (IV), a polyether-polysulfide of formula (V), a polysulfide-acid salt of formula (VI), or a polysulfide-acid salt of formula (VII):

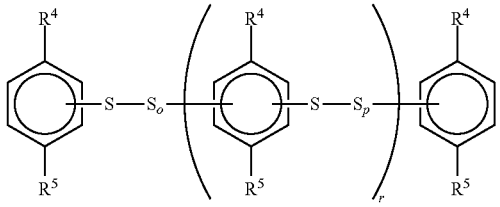

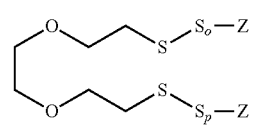

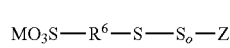

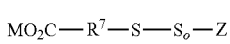

wherein $R^4$ independently is tert-butyl or tert-amyl, $R^5$ independently is OH, OLi or ONa, and r is 0 or more (e.g., 0-10) in formula (IV) with the aromatic rings being optionally substituted in one or more other positions with substituents other than hydrogen, $R^6$ is a divalent organic moiety in formula (VI), $R^7$ is a divalent organic moiety in formula (VII), each Z is independently a $C_1$-$C_{20}$ organic moiety, Li, Na, K, Mg, quaternaty ammonium or quaternary phosphonium, each M is independently Li, Na, K, Mg, quaternary ammonium, or quaternary phosphonium, and o and p are each independently an integer of 1 or more. Examples of such organosulfur species include the aromatic polysulfides sold by Arkema under the brand name Vultac® (formula IV, $R^4$=tert-butyl or tert-amyl, $R^5$=OH); and polysulfide-acid salts corresponding to formulas VI and VII derived from mercapto-acids such as mercaptoacetic acid, mercaptopropionic acid, mercaptoethanesulfonic acid, mercaptopropanesulfonic acid, or from olefin-containing acids such as vinylsulfonic acid or 2-acrylamido-2-methylpropanesulfonic acid.

In still another embodiment, the organosulfur species is an organo- or organo-metal polysulfide containing trithiocarbonate functionality of formula (IX), an organo- or organo-metal polysulfide containing dithiocarbonate functionality of formula (X), or an organo- or organo-metal polysulfide containing monothiocarbonate functionality of formula (XI):

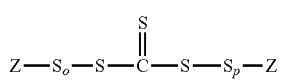

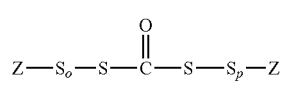

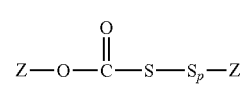

wherein Z is a $C_1$-$C_{20}$ organic moiety, Na, Li, K, Mg, quaternary ammonium, or quaternary phosphonium, and o and p are independently an integer of 1 or more.

The liquid or gel electrolyte solution may be additionally comprised of a dimetal polythiolate species of formula M-S—$S_n$-M, wherein each M is independently Li, Na, K, Mg, quaternary ammonium, or quaternary phosphonium and n is an integer of 1 or more. Such a species thus does not contain any organic moiety, unlike the above-described organosulfur species.

The intermediate separator element may function as a divider between compartments in an electrochemical cell. One compartment may comprise an electrolyte in contact with a cathode (the electrolyte in such compartment may be referred to as a catholyte). Another compartment may comprise an electrolyte in contact with an anode (the electrolyte in such compartment may be referred to as an anolyte). The anolyte and the catholyte may be the same as, or different from, each other. One or both of the anolyte and the catholyte may contain one or more organosulfur species in accordance with the present invention. The intermediate separator element may be positioned between such compartments in a manner so as to permit ions from the anolyte to pass through the intermediate separator element into the catholyte and vice versa, depending upon whether the electrochemical cell is being operated in the charge or discharge mode.

In a further embodiment of the invention, the intermediate separator element is comprised of a porous polymer. The porous polymer may, for example, be comprised of polypropylene, polyethylene, or a fluorinated polymer. The porous polymer may be functionalized with an organosulfur species of the type described herein. The organosulfur species may be pendant to the backbone of the porous polymer, may be present in crosslinks between the backbones of individual polymer chains and/or may be incorporated into the backbone of the porous backbone. Thus, the backbone of the porous polymer may contain one or more —S—$S_n$-linkages and/or —S—$S_n$-linkages may be pendant to the polymer backbone. Such —S—$S_n$-linkages may also be present in crosslinks.

Suitable solvents to be used in electrochemical cells in accordance with the invention include any of the basic (cation-complexing) aprotic polar solvents known or used for lithium-sulfur batteries generally such as sulfolane, dimethyl sulfoxide, dimethylacetamide, tetramethyl urea, N-methyl pyrrolidinone, tetraethyl sulfamide; ethers such as tetrahydrofuran, methyl-THF, 1,3-dioxolane, 1,2-dimethoxyethane (glyme), diglyme, and tetraglyme, and mixtures thereof; carbonates such as ethylene carbonate, propylene carbonate, dimethylcarbonate, diethylcarbonate, ethylmethylcarbonate, methylpropylcarbonate, ethylpropylcarbonate and the like; as well as esters such as methylacetate, ethyl acetate, propylacetate, and gamma-butyrolactone. The electrolyte may comprise a single such solvent or a mixture of such solvents. Any of the polar aprotic polymers known in the battery art could also be employed. The electrolyte may comprise a polymeric material and may take the form of a gel. Suitable polymers for use in the electrolyte may include, for example, polyethylene oxide, a polyethersulfone, a polyvinylalcohol, or a polyimide. The electrolyte may be in the form of a gel, which may be a three-dimensional network comprised of a liquid and a binder component. The liquid may be a monomeric solvent which is entrained within a polymer, such as a crosslinked polymer.

One or more conductive salts are present in the electrolyte in combination with the nonaqueous polar aprotic solvent and/or polymer. Conductive salts are well known in the battery art and include, for example, lithium salts of $(CF_3SO_2)_2N^-$, $CF_3SO_3^-$, $CH_3SO_3^-$, $ClO_4^-$, $PF_6^-$, $AsF_6^-$, nitrate, halogen or the like. Sodium and other alkali metal salts and mixtures thereof may also be used.

The anode active material may comprise an alkali metal such as lithium, sodium, potassium and/or magnesium or another active material or composition. Particularly preferred anode active materials include metallic lithium, alloys of lithium, metallic sodium, alloys of sodium, alkali metals or alloys thereof, metal powders, alloys of lithium and aluminum, magnesium, silicon, and/or tin, alkali metal-carbon and alkali metal-graphite intercalates, compounds capable of reversibly oxidizing and reducing with an alkali metal ion, and mixtures thereof. The metal or metal alloy (e.g., metallic lithium) may be contained as one film within a battery or as several films, optionally separated by a ceramic material. Suitable ceramic materials include, for example, silica, alumina, or lithium-containing glassy materials such as lithium phosphates, lithium aluminates, lithium silicates, lithium phosphorus oxynitrides, lithium tantalum oxide, lithium aluminosilicates, lithium titanium oxides, lithium silicosulfides, lithium germanosulfides, lithium aluminosulfides, lithium borosulfides, lithium phosphosulfides and mixtures thereof.

The anode may be in any suitable form, such as, for example, a foil, composite or other type of current collector.

In one embodiment of the invention, the anode is treated with at least one organosulfur species. Such treatment may be carried out by contacting a surface of the anode with the at least one organosulfur species. The organosulfur species may, for example, be in the form of a solution during such contacting step. Any suitable solvent or combination of solvents for the organosulfur species may be utilized to form such a solution. For example, the solvent(s) may be any of the aprotic polar solvents previously described. In one embodiment, the anode is treated with the organosulfur species prior to assembly of an electrochemical cell, such as by spraying a solution of the organosulfur species onto the anode or dipping the anode into a solution of the organosulfur species. In another embodiment, the organosulfur species is incorporated as a component of the electrolyte to be employed in the electrochemical cell, wherein the electrolyte containing the organosulfur species comes into contact with the anode upon assembly of the electrochemical cell.

In another embodiment, the anode comprises at least one organosulfur species in addition to at least one reactive metal selected from the group consisting of lithium, sodium, potassium and magnesium. For example, at least one organosulfur species may be deposited on a surface of the anode.

The cathode comprises elemental sulfur, elemental selenium or a mixture of elemental chalcogens. In one embodiment, the cathode is additionally comprised of one or more organosulfur species in accordance with those previously described in detail herein. The cathode may additionally and/or alternatively be comprised of a binder and/or an electrically conductive additive. Suitable binders include polymers such as, for example, polyvinyl alcohol, polyacrylonitrile, polyvinylidene fluoride (PVDF), polyvinyl fluoride, polytetrafluoroethylene (PTFE), copolymers from tetrafluoroethylene and hexafluoropropylene, copolymers from vinylidene fluoride and hexafluoropropylene, copolymers from vinylidene fluoride and tetrafluoroethylene, ethylene-propylene-diene monomer rubber (EPDM), and polyvinyl chloride (PVC). The electrically conductive additive may be, for example, a carbon in electrically conductive form such as graphite, graphene, carbon fibers, carbon nanotubes, carbon black, or soot (e.g., lamp or furnace soot). The cathode may be present in a battery or electrochemical cell in combination with a current collector, such as any of the current collectors known in the battery or electrochemical cell art. For example, the cathode may be coated on the surface of a metallic current collector.

Aspects of the invention Include:

1. A battery, comprising:
   a) an anode comprising an anode active material comprising sodium, lithium or an alloy or composite of at least one of sodium or lithium with at least one other metal for providing ions;
   b) a cathode comprising a cathode active material comprising elemental sulfur, elemental selenium or a mixture of elemental chalcogens; and
   c) an intermediate separator element positioned between the anode and cathode acting to separate liquid or gel electrolyte solutions in contact with the anode and cathode, through which metal ions and their counterions move between the anode and cathode during charge and discharge cycles of the battery;
   wherein the liquid or gel electrolyte solutions comprise a nonaqueous polar aprotic solvent or polymer and a conductive salt and at least one of conditions (i), (ii), (iii) or (iv) is met:
   (i) at least one of the liquid or gel electrolyte solutions additionally comprise at least one organosulfur species;
   (ii) the cathode is additionally comprised of at least one organosulfur species;
   (iii) the intermediate separator element comprises a functionalized porous polymer containing at least one organosulfur species;
   (iv) the anode is additionally comprised of or has been treated with at least one organosulfur species;
   wherein the organosulfur species comprises at least one organic moiety and at least one —S—S$_n$-linkage, n being 0 or an integer of 1 or more.

2. The battery of aspect 1, wherein the organosulfur species is selected from the group consisting of organic polysulfides, organic thiolates and organic polythiolates and mixtures thereof.

3. The battery of any one of aspects 1 and 2, wherein the organosulfur species contains one or more sulfur-containing functional groups selected from the group consisting of dithioacetal, dithioketal, trithio-orthocarbonate, thiosulfonate [—S(O)$_2$—S—], thiosulfinate [—S(O)—S—], thiocarboxylate [—C(O)—S—], dithiocarboxylate [—C(S)—S—], thiophosphate, thiophosphonate, monothiocarbonate, dithiocarbonate, and trithiocarbonate.

4. The battery of any one of aspects 1-3, wherein the organosulfur species is selected from the group consisting of aromatic polysulfides, polyether-polysulfides, polysulfide-acid salts and mixtures thereof.

5. The battery of any one of aspects 1-5, wherein the organosulfur species is an organic polysulfide of formula R$^1$—S—S$_n$—R$^2$, wherein R$^1$ and R$^2$ independently represent a C$_1$-C$_{20}$ organic moiety that may be linear, branched, or cyclic aliphatic or aromatic and that may optionally comprise one or more functional groups containing N, O, P, S, Se, Si, Sn, halogen and/or metal, and n is an integer of 1 or more.

6. The battery of any one of aspects 1-5, wherein the organosulfur species is an organic thiolate of formula RI$^1$—S-M or organic polythiolate of formula R$^1$—S—S$_n$-M, wherein R$^1$ is a C$_1$-C$_{20}$ organic moiety that may be linear, branched, or cyclic aliphatic or aromatic and that may optionally comprise one or more functional groups containing N, O, P, S, Se, Si, Sn, halogen and/or metal, M is lithium, sodium, potassium, magnesium, quaternary ammonium, or quaternary phosphonium, and n is an integer of 1 or more.

7. The battery of any one of aspects 1-6, wherein the organosulfur species is a dithioacetal or dithioketal of formulas (I) or (II), or a trithio-orthocarboxylate of formula (III);

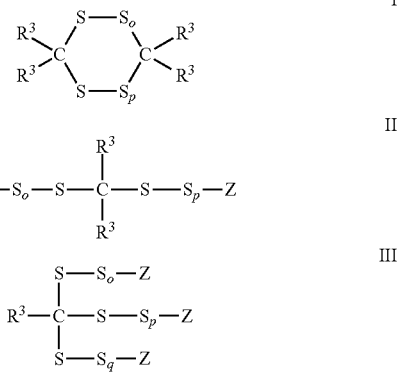

wherein each R$^3$ is independently H or a C$_1$-C$_{20}$ organic moiety that may be linear, branched, or cyclic aliphatic or aromatic and that may optionally comprise one or more functional groups containing N, O, P, S, Se, Si, Sn, halogen and/or metal, o, p and q are each independently an integer of 1 or more, and each Z is independently: a C$_1$-C$_{20}$ organic moiety that may be linear, branched, or cyclic aliphatic or aromatic and that may optionally comprise one or more functional groups containing N, O, P, S, Se, Si, Sn, halogen and/or metal; Li; Na; K; Mg; quaternary ammonium; or quaternary phosphonium.

8. The battery of any one of aspects 1-7, wherein the organosulfur species is an aromatic polysulfide of formula (IV), a polyether-polysulfide of formula (V), a polysulfide-acid salt of formula (VI), or a polysulfide-acid salt of formula (VII);

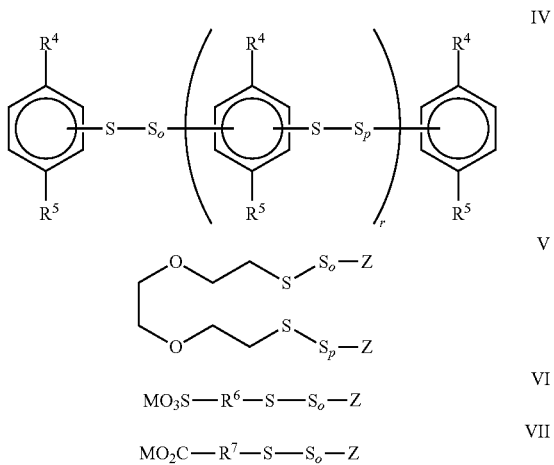

wherein R$^4$ independently is tert-butyl or tert-amyl, R$^5$ independently is OH, OLi or ONa, and r is 0 or more in formula (IV) with the aromatic rings being optionally substituted in one or more positions with substituents other than hydrogen, R$^6$ is a divalent organic moiety in formula (VI), R$^5$ is a divalent organic moiety in fonnula (VII), each Z is independently a C$_1$-C$_{20}$ organic moiety, Li, Na or quaternary ammonium, each M is independently Li, Na, K, Mg, quaternary ammonium, or quaternary phosphonium, and o and p are each independently an integer of 1 or more.

9. The battery of any one of aspects 1-8, wherein the organosulfur species is an organo- or organo-metal polysulfide containing trithiocarbonate functionality of formula (IX), an organo- or organo-metal polysulfide containing dithiocarbonate functionality of formula (X), or an organo- or organo-metal polysulfide containing monothiocarbonate functionality of formula (XI):

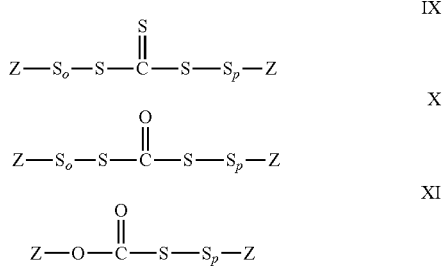

wherein Z is a $C_1$-$C_{20}$ organic moiety, Na, Li, quaternary ammonium or quaternary phosphonium, and o and p are each independently an integer of 1 or more.

10. The battery of any one of aspects 1-9, wherein the liquid or gel electrolyte solution is additionally comprised of a dimetal polythiolate species of formula M-S—$S_n$-M, wherein each M is independently Li, Na, K, Mg, quaternary ammonium, or quaternary phosphonium, and n is an integer of 1 or more.

11. The battery of any one of aspects 1-10, wherein the cathode is additionally comprised of at least one electrically conductive additive and/or at least one binder.

12. The battery of any one of aspects 1-11, wherein the organosulfur species is pendant to the backbone of the functionalized porous polymer.

13. The battery of any one of aspects 1-12, wherein the organosulfur species is crosslinked into or forms part of the backbone of the functionalized porous polymer.

14. The battery of any one of aspect 1-13, wherein the organic moiety contains at least two carbon atoms.

15. The battery of any one of aspects 1-14, wherein the intermediate porous separator separates the battery to provide an anolyte section associated with the anode and a catholyte section associated with the cathode and wherein the organosulfur species is present in at least one of the anolyte section or the catholyte section.

16. The battery of any one of aspects 1-15, wherein the non-aqueous polar aprotic solvent or polymer contains one or more functional groups selected from ether, carbonyl, ester, carbonate, amino, amido, sulfidyl [—S—], sulfinyl [—S(O)—], or sulfonyl [—SO$_2$—].

17. The battery of any one of aspects 1-16, wherein the conductive salt corresponds to formula MX wherein M is Li, Na or quaternary ammonium and X is $(CF_3SO_2)_2N$, $CF_3SO_3$, $CH_3SO_3$, $ClO_4$, $PF_6$, $NO_3$, $AsF_6$ or halogen.

18. The battery of any one of aspects 1-17, wherein the organic moiety is oligomeric or polymeric and the organosulfur species comprises at least one —S—S— linkage that is pendant to the backbone of the oligomeric or polymeric organic moiety.

19. The battery of any one of aspects 1-18, wherein the organic moiety is oligomeric or polymeric and the organosulfur species comprises at least one —S—S— linkage that in incorporated into the backbone of the oligomeric or polymeric organic moiety.

20. An electrolyte, comprising at least one nonaqueous polar aprotic solvent or polymer, at least one conductive salt, and at least one organosulfur species comprised of at least one organic moiety and at least one —S—$S_n$-linkage wherein n is 0 or an integer of 1 or more.

21. A cathode comprising a) elemental sulfur, elemental selenium or a mixture of elemental chalcogens, b) at least one electrically conductive additive, c) and at least one organosulfur species comprising at least one organic moiety and at least one —S—$S_n$-linkage, n being 0 or an integer of 1 or more.

22. The cathode of aspect 21, in combination with a current collector:

23. The cathode of any one of aspects 21 and 22, wherein the at least one electrical conductive additive includes at least one of graphite, carbon nanotubes, carbon nanofibers, graphene, carbon black or soot.

24. The cathode of any one of aspects 21-23, additionally comprising at least one binder.

25. An anode comprising an anode active material comprising sodium, lithium, potassium or magnesium or an alloy or composite of at least one of sodium, lithium, potassium or magnesium with at least one other metal for providing ions, wherein the anode additionally comprises or has been treated with at least one organosulfur species comprising at least one organic moiety and at least one —S—$S_n$-linkage, n being 0 or an integer of 1 or more.

Within this specification embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the composition or process. Additionally, in some embodiments, the invention can be construed as excluding any element or process step not specified herein.

EXAMPLES

Cathode Fabrication, Battery Preparation, and Battery Testing

Example 1

A positive electrode comprising 70 wt % sublimed elemental sulfur powder, 20 wt % polyethylene oxide (PEO, MW 4×10$^6$), 10 wt % A carbon black (Super P® Conductive, Alfa Aesar) was produced by the following procedure:

The mixture of these components in N-methyl-2-pyrrolidone (NMP) was mechanically ground in a planetary milling machine. Acetonitrile was added to dilute the mixture. The resulting suspension was applied onto aluminum foil (76 μm thickness) with an automatic film coater (Mathis). The coating was dried at 50° C. in a vacuum oven for 18 hrs. The resulting coating contained 3.10 mg/cm$^2$ cathode mixture.

Example 2

A positive cathode containing lithium n-dodecyl mercaptide (10 wt % of sulfur) was prepared following the procedure described in Example 1. The resulting coating contained 3.4 mg sulfur/cm²

Example 3

The positive cathode from Example 2 was used in a PTFE Swaglok cell with two stainless steel rods or coin cell assembly made of stainless steel (CR2032). The battery cell was assembled in an argon filled glove box (MBraun) as follows: the cathode electrode was placed on the bottom can followed by the separator. Then electrolyte was added to the separator. A lithium electrode was placed onto of the separator. A spacer and a spring were placed on top of the lithium electrode. The battery core was sealed with the stainless steel rods or with a crimping machine.

Example 4

Following the procedure described in Example 3, a battery cell consisting of cathode from Example 2 (7/16" diameter), 20 μL of 0.5 M LiTFSI solution in tetraethylene glycol dimethyl ether (TEGDME):1,3-dioxolane (DOL)=1:1, separator, and lithium electrode (thickness 0.38 mm, diameter 7/16") was tested for charge-discharge cycling at a current of 0.1 mA. The testing was carried out using Gamry potentiometer (Gamry Instruments) to cut-off voltage of 1.5 V and 3.2 V at room temperature. The discharge cycle profile is illustrated in FIG. 1.

Syntheses of Lithium Alkylmercaptides

Example 5—Synthesis of Lithium n-Dodecyl Mercaptide with Hexyl Lithium

To n-dodecyl mercaptan (9.98 g, 1 eq.) in hexanes (100 mL) at −30° C. was added n-hexyllithium (33 wt % in hexane, 1.1 eq.) dropwise to maintain mixture temperature below −20° C. The solvent was removed under reduced pressure to yield a white solid at quantitative yield.

Example 6—Synthesis of Lithium n-Dodecyl Mercaptide with Lithium Hydroxide

A mixture of n-dodecyl mercaptan (2.0 g, 1 eq.) and lithium hydroxide monohydrate (0.41 g, 1 eq.) in acetonitrile (8 mL) was heated to 75° C. and stirred at 75° C. for 16 hrs. After cooling to room temperature, the reaction mixture was filtered. The filter cake was rinsed with acetonitrile and dried at 50° C. in a vacuum oven over night. The lithium n-dodecylmercaptide was obtained as a white solid in 93.5% yield (1.93 g)

Example 7—Synthesis of Lithium n-Dodecyl Mercaptide with Hexyl Lithium

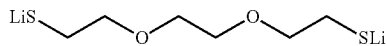

Following the procedure described in Example 6, 3,6-dioxaoctane-1,8-dithiol di-lithium salt was synthesized from the di-mercaptan as a white solid in quantitative yield.

Syntheses of Lithium Alkyl Polythiolates

Example 8—Synthesis of Lithium n-Dodecylpolythiolate with Lithium Hydroxide

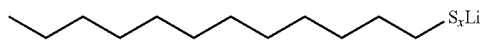

To a nitrogen degassed solution of n-dodecyl mercaptan (2.00 g, 1 eq.) in 1,3-dioxolane (25 mL) was added lithium hydroxide monohydrate (0.41 g, 1 eq.) and sulfur (1.27 g, 4 eq.). The mixture was stirred under nitrogen at room temperature for 30 min. Lithium n-dodecyl polythiolate in 1,3-dioxolane was obtained as a dark red solution. Complete conversion of mercaptan to lithium n-dodecyl polythiolate was confirmed by $^{13}$C-NMR and LCMS.

Example 9—Synthesis of Lithium 3,6-Dioxaoctane-1,8-Polythiolate with Lithium Hydroxide and Sulfur

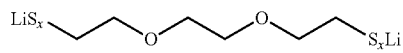

Following the procedure described in Example 8, dark red solution of lithium 3,6-dioxaoctane-1,8-polythiolate in 1,3-dioxolane from reaction of 3,6-dioxaoctane-1,8-dithiol (0.72 g, 1 eq.), lithium hydroxide monohydrate (0.33 g, 2 eq.), and sulfur (1.02 g, 8 eq.) in 1,3-dioxolane (10 mL).

Example 10—Synthesis of Lithium n-Dodecylpolythiolate from the Lithium Alkyl Mercaptide To a nitrogen degassed slurry of lithium n-dodecyl mercaptide (0.21 g, 1 eq.) in 1,3-dioxolane (5 mL) was added sulfur (0.13 g, 4 eq.). The mixture was stirred under nitrogen at room temperature for 16 hrs. Insoluble solids were removed by filtration. The dark red filtrate contained 63% of lithium n-dodecyl polythiolates and 37% of a mixture of bis(n-dodecyl)polysulfides as determined by LCMS.

Example 11—Synthesis of Lithium n-Dodecylpolythiolate with Lithium Metal and Sulfur To a nitrogen degassed solution of n-dodecyl mercaptan (2.23 g, 1 eq.) in 1,3-dioxolane (25 mL) was added sulfur (1.41 g, 4 eq.), and lithium (76.5 mg). The mixture was heated to 60° C. and stirred under nitrogen at 60° C. for 1 hr. Lithium n-dodecyl polythiolate in 1,3-dioxolane was obtained as a dark red solution. Complete conversion of n-dodecyl mercaptan was confirmed by $^{13}$C-NMR.

Example 12—Synthesis of Lithium 3,6-Dioxaoctane-1,8-Polythiolate with Lithium Metal and Sulfur Following the procedure in Example 11, a dark red solution of lithium 3,6-dioxaoctane-1,8-polythiolate in 1,3-dioxolane was obtained by reaction of 3,6-dioxaoctane-1,8-dithiol (1.97 g, 1 eq.), lithium metal (0.15 g, 2 eq.), and sulfur (2.77 g, 8 eq.) in 1,3-dioxolane (11 mL). Complete conversion of starting di-mercaptan was confirmed by $^{13}$C-NMR Example 13—Dissolution of Li$_2$S by Added Lithium n-Dodecylpolythiolate To determine the solubility of lithium sulfide in electrolyte with lithium n-dodecylpolythiolate, a saturated solution of lithium sulfide was prepared as follows: A 0.4 M solution of lithium n-dodecylpolythiolate in 1,3-dioxolane was prepared following procedures described in Example 10. The solution was then diluted to 0.2 M with tetraethylene glycol dimethyether, then added to 1M LiTFSI solution in 1:1 tetraethylene glycol dimethylether:1,3-dioxolane at 1:1=v/v. To the resulting solution, lithium sulfide was added until a saturated mixture was obtained. The mixture was then filtered and the filtrate was analyzed for dissolved lithium by ICP-MS (Agilent 7700x ICP-MS). The solubility of lithium sulfide was calculated based on the lithium level. In 0.5 M LiTFSI with 0.1 M n-dodecylpolythiolate in 1:1 tetraethylene glycol dimethylether:1,3-dioxolane, solubility of lithium sulfide was determined to be 0.33 wt %. In contrast, without lithium n-dodecylpolythiolate, the solubility of lithium sulfide in 0.5 M LiTFSI was only 0.13 wt %. This clearly demonstrated the improved solubility of Li$_2$S in the electrolyte matrix of the battery when the organosulfurs of this invention are present.

Example 14—Preparation of Battery Containing Organosulfur Species-Treated Anode

Figure 2:
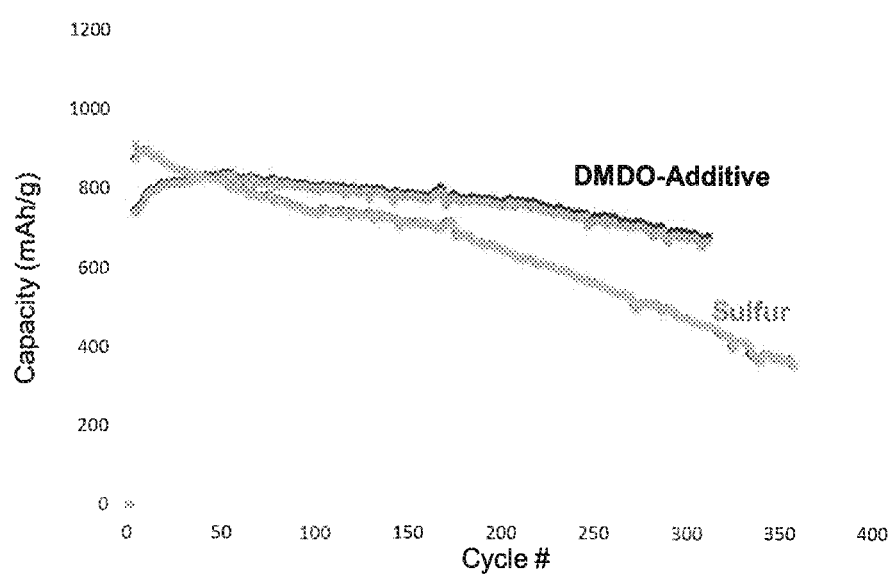
FIG. 2 shows comparison of cycling performance of a cell prepared with and without the anode being treated with 3,6-dioxaoctane-1,8-dithiol di-lithium salt (LiS—$C_2H_4$—O—$C_2H_4$—O—$C_2H_4$—SLi).

This example demonstrates the preparation of a battery cell that has an anode that has been exposed to an electrolyte containing an organosulfur species in accordance with one aspect of the invention. Elemental sulfur was combined with conductive carbon and polyethylene (as a binder) in a mass ratio (sulfur:carbon:polyethylene) of 75:20:5 and ball milled into a slurry with chloroform. The slurry was then blade-cast onto carbon-coated aluminum foil and air-dried, resulting in a sulfur loading of approximately 0.5 mg/cm$^2$. The resulting cathode was then assembled into CR2032 coin cells with a polypropylene separator and a lithium foil mode in an argon-filled glove box. The electrolytes used each contained 0.38 M lithium bis(trifluoromethane)sulfonamide and 0.38 M lithium nitrate in a 1:1 v/v mixture of 1,3-dioxolane and 1,2-dimethoxyethane. One electrolyte (in accordance with the present invention) additionally contained 100 mM 3,6-dioxaoctane-1,8-dithiol di-lithium salt (LiS—C$_2$H$_4$—O—C$_2$H$_4$—O—C$_2$H$_4$—SLi) (thereby bringing the lithium foil anode into contact with 3,6-dioxaoctane-1,8-dithiol di-lithium salt), while the other electrolyte (control) did not contain any organosulfur species. Battery cycling was done on a battery test from 1.7 to 2.6 V. 40 at C/2 with respect to active sulfur. The results observed are shown in FIG. 2.

What is claimed is:

1. A battery, comprising:
   a) an anode comprising an anode active material comprising sodium, lithium or an alloy or composite of at least one of sodium or lithium with at least one other metal for providing ions;
   b) a cathode comprising a cathode active material comprising elemental sulfur, and optionally elemental selenium or a mixture of elemental chalcogens; and
   c) an intermediate separator element positioned between the anode and cathode acting to separate liquid or gel electrolyte solutions in contact with the anode and cathode, through which metal ions and their counterions move between the anode and cathode during charge and discharge cycles of the battery;
   wherein the liquid or gel electrolyte solutions comprise a nonaqueous polar aprotic solvent or polymer and a conductive salt and at least one of conditions (i), (ii) or (iii) is met:
   (i) at least one of the liquid or gel electrolyte solutions additionally comprise at least one organosulfur species;
   (ii) the intermediate separator element comprises a functionalized porous polymer containing at least one organosulfur species;
   (iii) the anode is additionally comprised of or has been treated with at least one organosulfur species;
   wherein the organosulfur species is selected from the group consisting of an organic polysulfide of formula R$^1$—S—S$_n$—R$^2$, an organic thiolate of formula R$^1$—S-M, and an organic polythiolate of formula R$^1$—S—S$_n$-M, wherein R$^1$ is a C$_1$-C$_{20}$ organic moiety that may be linear, branched, cyclic aliphatic or aromatic and that optionally comprises one or more functional groups containing N, O, P, S, Se, Si, Sn, halogen and/or metal, M is lithium, sodium, potassium, magnesium, quaternary ammonium, or quaternary phosphonium, and n is an integer of 1 or more.

2. The battery of claim 1, wherein the organosulfur species is a dithioacetal or dithioketal of formulas (I) or (II), or a trithio-orthocarboxylate of formula (III):

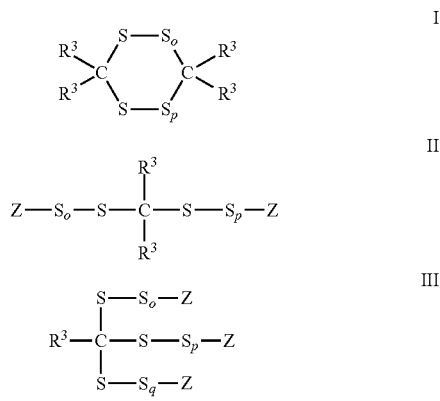

wherein each R$^3$ is independently H or a C$_1$-C$_{20}$ organic moiety that may be linear, branched, or cyclic aliphatic or aromatic and that may optionally comprise one or more functional groups containing N, O, P, S, Se, Si, Sn, halogen and/or metal, o, p and q are each independently an integer of 1 or more, and each Z is independently: a C$_1$-C$_{20}$ organic moiety that may be linear, branched, or cyclic aliphatic or aromatic and that may optionally comprise one or more functional groups containing N, O, P, S, Se, Si, Sn, halogen and/or metal; Li; Na; K; Mg; quaternary ammonium; or quaternary phosphonium.

3. The battery of claim 1, wherein the organosulfur species is an aromatic polysulfide of formula (IV), a polyether-polysulfide of formula (V), a polysulfide-acid salt of formula (VI), or a polysulfide-acid salt of formula (VII):

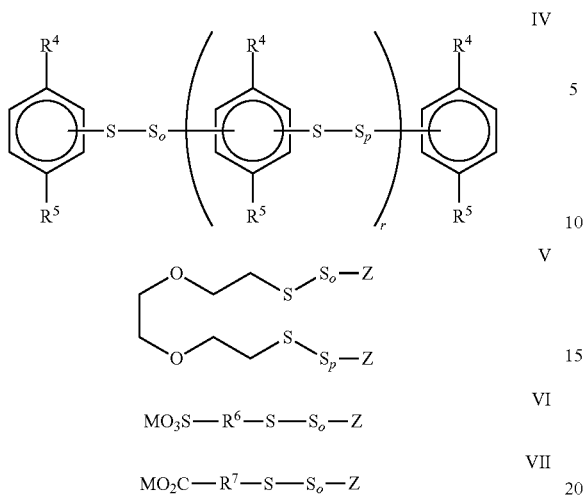

IV

V

VI

VII

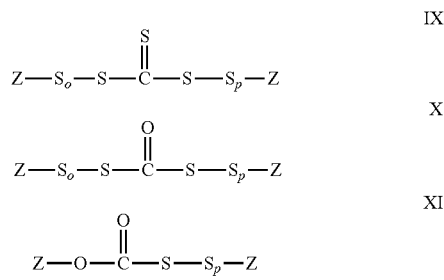

IX

X

XI wherein $R^4$ independently is tert-butyl or tert-amyl, $R^5$ independently is OH, OLi or ONa, and r is 0 or more in formula (IV) with the aromatic rings being optionally substituted in one or more positions with substituents other than hydrogen, $R^6$ is a divalent organic moiety in formula (VI), $R^5$ is a divalent organic moiety in formula (Vii), each Z is independently a $C_1$-$C_{20}$ organic moiety, Li, Na or quaternary ammonium, each M is independently Li, Na, K, Mg, quaternary ammonium, or quaternary phosphonium, and o and p are each independently an integer of 1 or more.

4. The battery of claim 1, wherein the organosulfur species is an organo- or organo metal polysulfide containing trithiocarbonate functionality of formula (IX), an organo- or organo-metal polysulfide containing dithiocarbonate functionality of formula (X), or an organo- or organo-metal polysulfide containing monothiocarbonate functionality of formula (XI):

wherein Z is a $C_1$-$C_{20}$ organic moiety, Na, Li, quaternary ammonium or quaternary phosphonium, and o and p are each independently an integer of 1 or more.

5. The battery of claim 1, wherein the liquid or gel electrolyte solution is additionally comprised of a Bimetal polythiolate species of formula M-S—$S_n$-M, wherein each M is independently Li, Na, K, Mg, quaternary ammonium, or quaternary phosphonium, and n is an integer of 1 or more.

6. The battery of claim 1, wherein the organic moiety contains at least two carbon atoms.

7. The battery of claim 1, wherein the non-aqueous polar aprotic solvent or polymer contains one or more functional groups selected from ether, carbonyl, ester, carbonate, amino, amino, sulfidyl [—S—], sulfinyl [—S(O)—], or sulfonyl [—$SO_2$—].

8. The battery of claim 1, wherein the conductive salt corresponds to formula MX wherein M is Li, Na or quaternary ammonium and X is $(CF_3SO_2)_2N$, $CF_3SO_3$, $CH_3SO_3$, $ClO_4$, $PF_6$, $NO_3$, $AsF_6$ or halogen.

9. The battery of claim 1, wherein the organic moiety is oligomeric or polymeric and the organosulfur species comprises at least one —S—S— linkage that is pendant to the backbone of the oligomeric or polymeric organic moiety.

10. The battery of claim 1, wherein the organic moiety is oligomeric or polymeric and the organosulfur species comprises at least one —S—S— linkage that in incorporated into the backbone of the oligomeric or polymeric organic moiety.

* * * * *